Sept. 24, 1968
K. BELTER
3,402,469
WAX FORMING APPARATUS
Filed Oct. 7, 1965
3 Sheets-Sheet 1
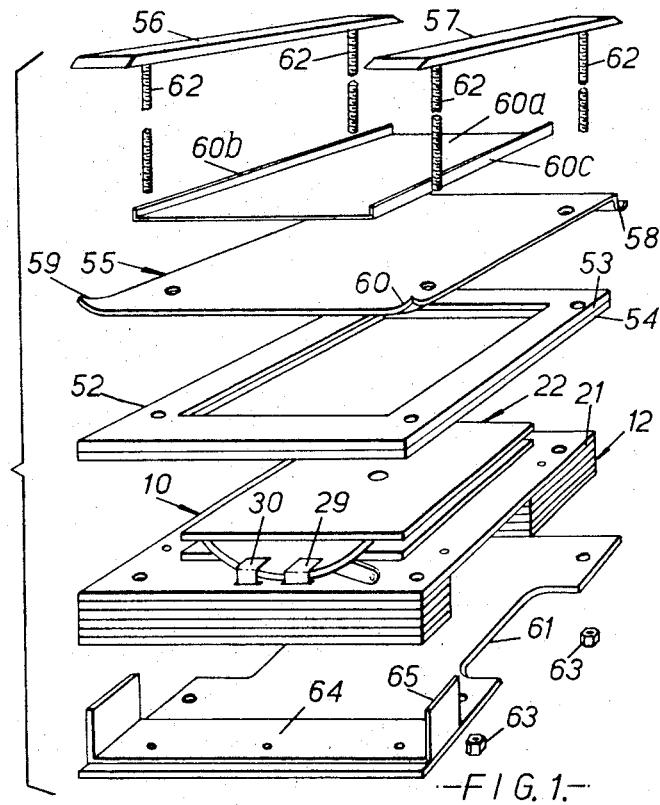
—FIG. 1.—
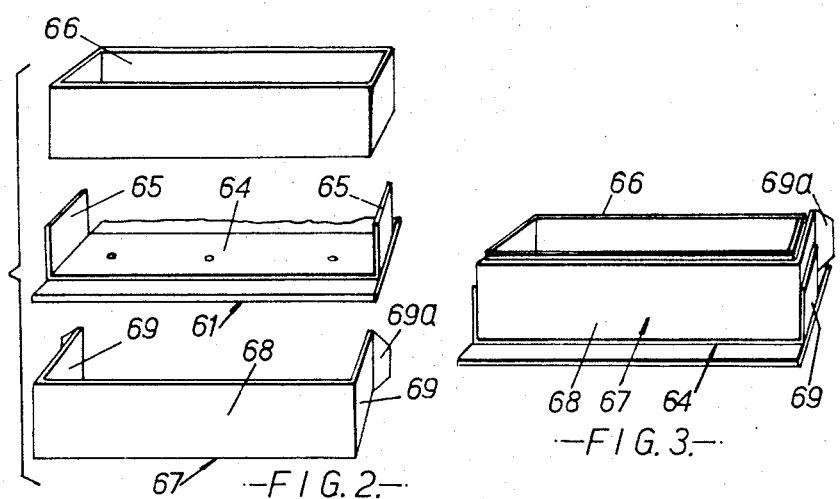
—FIG. 2.—   —FIG. 3.—
INVENTOR:
KAROL BELTER
BY
Norris + Bateman
atty, Sept. 24, 1968   K. BELTER   3,402,469
WAX FORMING APPARATUS
Filed Oct. 7, 1965   3 Sheets-Sheet 2
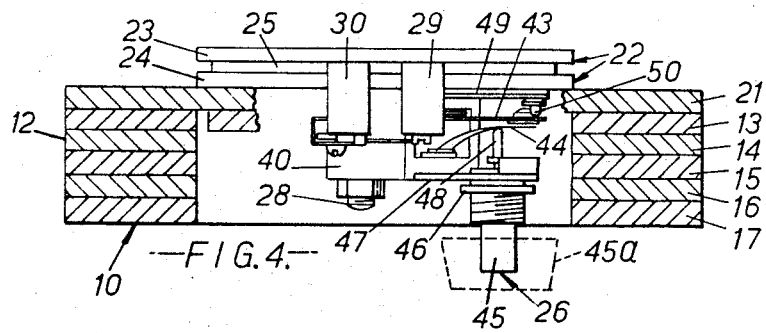
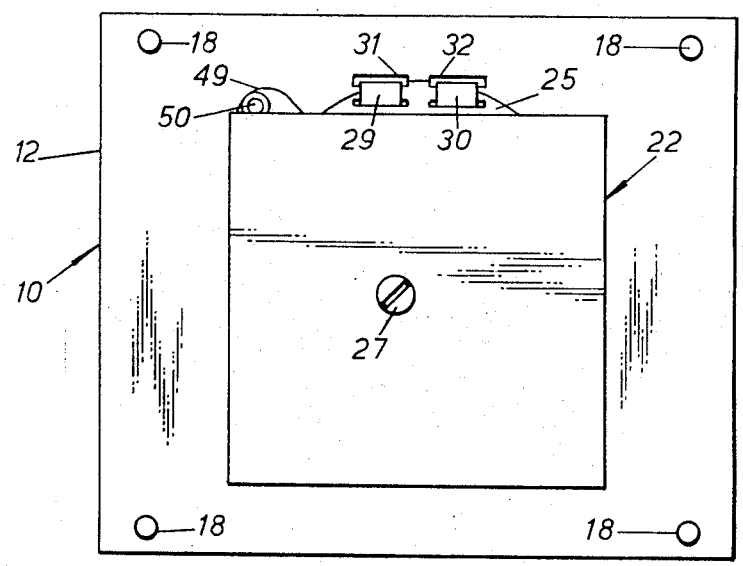
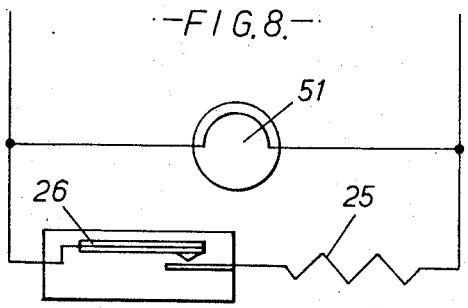
INVENTOR:
KAROL BELTER
BY
Norris + Bateman
Attys Sept. 24, 1968    K. BELTER    3,402,469
WAX FORMING APPARATUS
Filed Oct. 7, 1965    3 Sheets-Sheet 3
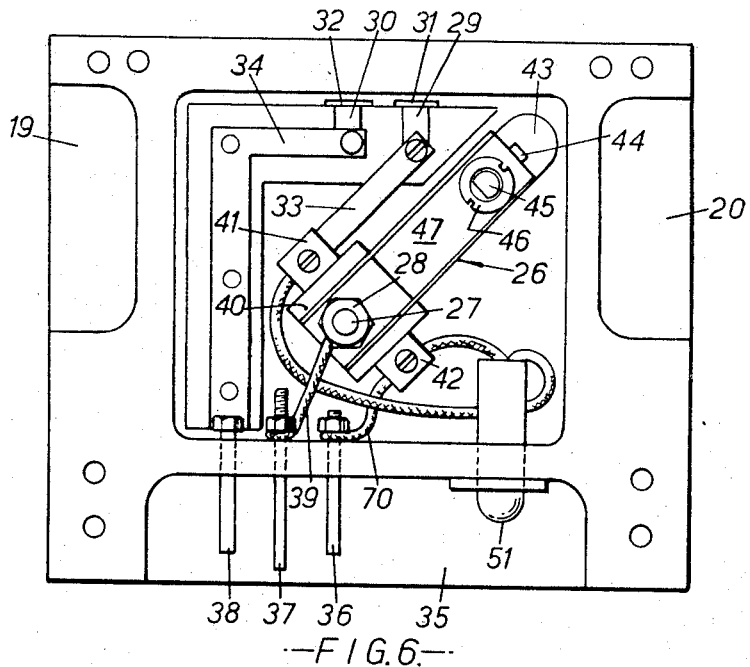
—FIG.6.—
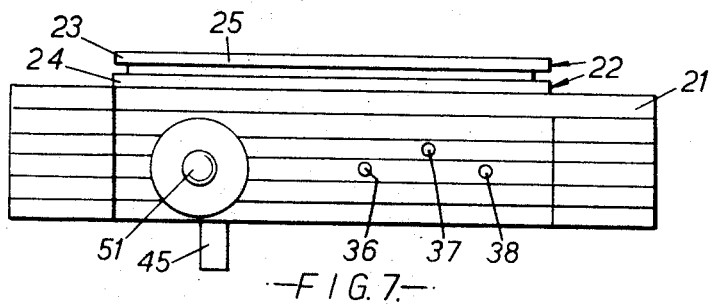
—FIG.7.—
INVENTOR:
KAROL BELTER
BY
Norris + Bateman
attys

3,402,469
WAX FORMING APPARATUS
Karol Belter, 80 Bingley Road, Saltaire,
Shipley, Yorkshire, England
Filed Oct. 7, 1965, Ser. No. 493,750
Claims priority, application Great Britain, Oct. 8, 1964,
41,013/64
6 Claims. (Cl. 32—70)

ABSTRACT OF THE DISCLOSURE

A dentist's bite block preparing apparatus comprises a hollow body of electrical and thermal insulating material on the top of which is a flat electrially heated surface, a thermostatic control switch being enclosed within the body and a bottom cover on the body extending beyond one edge to mount a trough toward which melted wax or the like is directed from the heated surface.

---

During the construction of dental prosthesis, the dental surgeon usually finds it necessary to record the correct bite. This is done by the use of wax bite blocks which are made to a model of the patient's mouth. These have then to be trimmed to the correct depth and plane. Trimming is performed with a heated knife, and is time consuming. Moreover, the trimming has to be performed in the surgery and creates a considerable amount of drops and parings which have to be cleaned.

The object of this invention is the provision of apparatus for forming wax which is particularly suitable for use in trimming bite blocks, although it may have other uses where wax of low melting point has to be formed.

According to this invention denists bite block forming apparatus comprises a plate, means secured to the plate for heating the same, and trough means attached to the plate to catch molten wax dropping off the plate.

Preferably the plate is provided with barrier devices along all but one of its edges, the trough means being provided along that edge where there is no barrier. The barrier means may comprise a wall or small trough.

It is also preferred to heat the plate electrically and to provide automatic control of the maximum temperature and for complete removal of the apparatus from the electric power supply.

One construction of a dentist's bite block forming appliance will now be described by way of example only, with reference to the accompanying drawings in which:

FIGURE 1 is an exploded view of the appliance,
FIGURE 2 is an exploded view of the trough,
FIGURE 3 is an assembled view of the trough,
FIGURE 4 is a section through the assembled appliance with top and bottom plates removed,
FIGURE 5 is a view looking down on the assembly shown in FIGURE 4,
FIGURE 6 is a view looking at the assembly shown in FIGURE 4 from underneath,
FIGURE 7 is a rear view of the appliance, and
FIGURE 8 is a circuit diagram of the electrical components.

The appliance is intended to be used to provide a warm plate upon which a wax bite block can be placed to melt the underside of the bite block, and so reduce its depth. The actual method of use will be described in detail later, but it will be appreciated that the plate will have to be sufficiently warm to melt the wax, and must retain a wax-melting temperature for at least several minutes, to be of real value. Also the appliance should preferably be portable and easily handled.

As will be apparent from even a cursory examination of the drawings, the appliance has a body 10 which is built-up as a laminated structure. The various laminates are made of glass fibre reinforced resin material which has high strength and good thermal and electrical insulation properties.

The body has a central housing 12, which (as shown in FIGURES 1 and 4) is made up of several laminates 13, 14, 15, 16 and 17 secured together by rivets 18, although it could be moulded as a single piece. This housing is in the form of a hollow square, to accomodate certain electrical apparatus as shown in FIGURES 4 and 6, and there are recesses 19 and 20 in opposite sides of the housing 12 to provide a convenient means for gripping the appliance. The overall dimensions of the appliance are such that it can be held in the hand with the thumb in one of the recesses and the fingers in the other recess.

A support laminate 21 is fixed to the top of the housing (by the same rivets 18 which hold the various laminates of the housing together), and an electrical slab heater 22 is fixed to the top of the support laminate. The heater 22 comprises a pair of metal plates 23 and 24, between which there is sandwiched a flat electric heating element 25 of the type comprising a resistance wire coiled around a flat former between a pair of electrical insulation members (as used in electric irons for example). A control switch 26, which will be described in detail later is fixed to the underside of the heater 22 (by a bolt 27 and a nut 28) and extends through a slot in the support laminate 21 into the interior of the housing 12.

Two thin metal conductor strips 29 and 30 extend from the heating element 25, one being connected to each end of the resistance wire of the element. These strips are bent downwardly and pass through slits 31 and 32 in the support laminate 21 into the interior of the housing 12, where they are connected respectively to two further metal strip conductors 33 and 34.

At the rear of the housing 12, there is a recess 35, and within this recess, there are three conductor pins 36, 37 and 38 in the formation required to fit a 5 amperes three pin electrical socket. The centre pin 37 is the usual earth pin and there is an electrical lead 39 from this pin to the control switch 26 (see FIGURE 6). The conductor 34 is attached to the pin 38, and the conductor 33 is attached to one side of the control switch 26. From the other side of this switch there is an electrical lead 70 to the pin 36, so that if the pins are plugged into an electrical socket, and the switch 26 is closed, there is an electrical path through the heating element 25, and the latter will be heated.

The control switch 26 is a thermostat, responsive to the temperature of the heater 22. It has a porcelain support block 40 from each side of which there projects a terminal 41 and 42. Within the block, the terminal 41 is fixed to a copper lever 43. A thin copper element 44 fixed to the free end of the lever 43 has a contact at its other end (inside the block 40) which contact normally engages with the part of the terminal 42.

An adjusting member 45 is rotatable in a bearing 46 carried by a fixed arm 47 on the block 40. The adjustable member carries an insulated nipple 48 at its upper end and this nipple is engageable with the thin copper strip 44 to provide a fulcrum for that strip. Furthermore, the rotatable member 45 has a screw-and-nut arrangement whereby as it is rotated, it varies the height of the npple 48.

A bimetal strip 49 is fixed at one end to the top of the porcelain block 40, and at its other end has an insulated nipple 50 pressing against the free end of the lever 43. On its upper side the bimetal strip 49 engages against the bottom plate 24 of the heater. When the bimetal strip bends downward owing to a rise in temperature, it presses the free end of the lever 43 and the thin strip 44 downwards. The latter eventually engages with the nipple 48, and this causes its other end to move upwards, opening the switch by breaking the connection between the terminals 41 and 42. The switch therefore provides a means of thermostatically controlling the supply of electrical current to the heating element, and the temperature at which the switch will open can be adjusted, by adjusting the height of the nipple 48. The adjustable member 45 is fitted with a knob 45a on the underside of the body to facilitate setting of the thermostat.

Referring now to FIGURE 8, it will be seen that the thermostat switch 26 is connected in a series with the heating element 25. A coloured lamp 51 is fixed to the wall of the housing 12, within the recess 35, and this lamp is connected in parallel with the switch 26. Since the resistance of the lamp will be much higher than that of the heater, virtually no current will flow through the lamp when the switch 26 is closed. However, when the switch opens, current will flow through the lamp to give an indication that the heater has reached the desired temperature.

The top of the housing 12 is covered by a top assembly 52, which comprises two laminates 53 and 54, shaped to fit around the heater 22 (and riveted together) a hot plate 55 made of metal and a pair of guide strips 56 and 57. As shown in FIGURE 1, the hot plate is large enough to cover the entire area of the housing 12 and it will be appreciated that when assembled, it engages with the top surface of the plate 23. Along its rear edge, the hot plate is formed with a small trough 58 (see FIGURE 1) to catch any molten wax which might flow over the rear edge, although—as will become apparent later—this is rather unlikely. The two front corners of the hot plate are upturned as indicated at 59 and 60 to act as guides, so that molten wax flowing over the front edge of the hot plate is guided away from the sides. A thin top plate 60a is fitted between the guide strips 56 and 57, and has upturned edges 60b and 60c which are approximately the same depth as the thickness of the guide strips. This top plate prevents molten wax from running between the guide strips and the hot plate and then into the rivet holes. The top plate however, is an optional feature and if not fitted, the hot plate 55 acts as the top plate.

A bottom cover 61 is also provided to enclose the bottom of the housing 12, and (as shown in FIGURE 1) there are four bolts 62 (preferably with countersunk heads) which pass through holes in the guide strips 56 and 57, the hot plate 55, the housing 12 and the bottom cover 61, and nuts 63 which engage with the bolts to clamp the entire assembly together.

The front of the bottom cover projects in front of the housing 12, and a metal support strip 64 with upturned ends 65 is fixed to this projecting portion of the bottom cover. A metal trough 66 is made of such a length that it fits between the upturned ends 65 of the strip 64 with a small clearance at each end, and there is a locking member 67, comprising a front retaining strip 68 and rearwardly directed ends 69, which is of such a size that it can be fitted (as shown in FIGURE 3) with its ends 69 between the ends of the trough 66 and the ends 65 of the strip 64. The rear extremities 69a of the ends 69 of the locking member are splayed outwardly, so that the locking member can only be fitted or removed by vertical movement, and once in place, it will hold the trough 66 in position both endwise (between the ends 69) and also between the retaining strip 68 and the front of the housing 12. In this assembled position, the trough is underneath the front edge of the hot plate 55.

When it is required to use the appliance to melt a bite block, it is first plugged into an electric socket, until the lamp indicates that the predetermined temperature has been arrived at. The appliance is then unplugged, and taken to the dentists implement tray. A bite block can then be placed on the top plate 60a and the underside of the bite block will begin to melt. By manipulation of the block, and by applying pressure at appropriate positions, it is possible to adjust the depth and plane of the block. It will be found that a flat smooth surface is produced on the underside of the block without time consuming paring. It is an important feature of the invention that it is possible to use the appliance for some time after it has been disconnected from the electrical socket. The heat remains stored in the hot plates for a considerable time consequently, the use of the appliance is facilitated due to the absence of flex wires.

By tilting the appliance, all the molten was is caused to run into the trough 66 and in any case there are barriers (lips 60b, 60c, guide strips 56 and 57 and trough 58) which prevent the molten wax flowing over any of the other edges. It will be appreciated that the appliance may be provided with legs and that the leg or legs at the rear may be longer than that or those at the front to give the required tilt to the appliance. If legs are provided, it is preferred that there are three legs only, two long legs at the rear and a single shorter leg at the front, so that the appliance will stand firmly even on uneven surfaces. The provision of legs also allows easy access to the underside of the appliance when it has to be gripped.

When it is required to empty the trough, the locking member 67 is withdrawn, and the trough 66 is then removed, and placed on the hot plate. This will melt the wax which can then be poured out of the trough into a receptacle.

I claim:

1. Bite block forming apparatus for dental use comprising a hollow body of electrical and thermal insulating material, an electrical heater secured over the top of said body and a plate secured over said heater providing an upwardly exposed bite block heating surface, means providing an electrical circuit enclosed in said hollow body and adapted to be connected for energizing and controlling said heater, a bottom cover secured upon said body, and an upwardly open trough secured on said bottom cover to lie along one side of said body in position to receive melted material flowing from said surface.

2. The apparatus defined in claim 1, wherein said circuit includes a normally closed thermostatic switch mounted on the underside of said heater and disposed within said hollow body, said switch opening said circuit when a predetermined temperature is attained at said heating surface.

3. The apparatus defined in claim 2 including a signal lamp connected in parallel across said switch and adapted to conduct and be lighted when the circuit is energized and said switch opens.

4. Dentists bite block forming apparatus comprising a body, an electric heating element housed within said body, an electrical control circuit for said heating element, said control circuit including a thermostatically controlled switch, a top structure carried on said body, said top structure including a plate, barrier means along all but one of the edges of said plate to prevent molten wax spilling off said plate, a trough along said one edge of said plate to catch molten wax dropping off said plate, a bottom cover for said body, said trough connected to and supported by said bottom cover, and means for fastening said body, top structure and bottom cover together.

5. Dentists bite block forming apparatus according to claim 4, wherein said one edge of the plate is at the front of said apparatus and said body is provided on its underside with three legs, two of the said legs being longer than the other of said three legs, said two longer legs being disposed at the rear of said body, and said shorter leg being disposed at the front of said body.

6. Dentists bite block forming apparatus comprising a plate, electrical heating means secured to said plate for heating same, and a trough attached to said plate to catch molten wax dropping off an edge of said plate, said trough comprising a channel shaped member locked to said plate by a locking member having a front retaining strip and rearwardly directed ends, upstanding members fixed to said plate, said locking member ends having outwardly directed portions for engagement behind said upstanding members.

References Cited
UNITED STATES PATENTS

| | | | |
|---|---|---|---|
| 2,774,295 | 12/1956 | Watkins | 99—425 |
| 2,830,372 | 4/1958 | Macari | 32—70 |
| 3,130,664 | 4/1964 | Jarmuth et al. | 99—425 |

LOUIS G. MANCENE, *Primary Examiner.*

R. PESHOCK, *Assistant Examiner.*